Patented Jan. 15, 1929.

1,699,258

UNITED STATES PATENT OFFICE.

JOHN T. TRAVERS, OF COLUMBUS, OHIO, ASSIGNOR, BY DIRECT AND MESNE ASSIGN-MENTS, TO THE TRAVERS-LEWIS PROCESS CORPORATION, OF COLUMBUS, OHIO, A CORPORATION OF OHIO.

PROCESS FOR TREATING SULPHITE PULP WASTE.

No Drawing.     Application filed June 21, 1927. Serial No. 200,492.

This invention has for its object the provision of a process for purifying the sulphite pulp waste discharged from pulp works.

The invention contemplates the provision of such a process which is sufficiently flexible to permit of the desirable degree of purification necessary to permit the waste to be cared for by the dilution which may be available at the location of the pulp mill.

To the end that the invention may be clearly understood, the following description of sulphite pulp waste is given: This waste consists essentially of the spent sulphite liquors used for the digestion of wood chips employed in the pulp mill and the subsequent washings of the pulp. The liquor used for the dissolving out of the wood the inter-cellular and non-cellulose constituents comprises a solution of calcium and magnesium bi-sulphites with an excess of free sulphurous acid. During the cooking process, most of the sulphurous acid is oxidized to sulphuric and sulphonic acid. The exact reactions are not known but it is known that this oxidation does take place. The spent sulphite waste contains calcium and magnesium sulphates and sulphites and sulphuric, sulphurous, and sulphonic acids, along with all the inter-cellular and non-cellulose constituents of the wood. In washing and screening the pulp a quantity of very finely divided fiber also enters the waste. This finely divided fiber when discharged with the waste into a stream causes a slimy deposit to form on the bed of the stream.

The amount of organic constituents of the wood which passes into the waste is approximately equal to the amount of pulp obtained by the sulphite process. This fact indicates the amount of water solids produced in any given pulp mill. This large amount of organic matter and the free acid present in the waste constitute the source of pollution in streams receiving this waste. It constitutes a burden which few streams even of large flow are able to carry.

The large amount of organic matter in the waste causes an objectionable foaming in the streams into which this waste is discharged. The slimy deposits of the suspended matter on the bed of the streams prevent the spawning of fish and are thus detrimental to fish life. Furthermore, the acid content of the waste is sufficiently large to kill the aquatic life in the stream into which the waste is discharged. Even though the stream were sufficiently large to supply the necessary oxygen demand for this waste, the stream would still be polluted by the suspended matter and acid content of the waste.

The acidity of the waste discharged from different pulp mills will vary, depending upon the amount of dilution with the wash waters and the concentration will vary as the available water supply is plentiful or scarce. This waste when it leaves the pulp mill is sterile since it is strongly acid and has been subjected to high temperatures. It is accordingly unsuited for the propagation of bacteria. For this reason all methods involving the destruction of this waste by means of bacteria have failed. The waste, subsequent to being discharged into a stream, however, will, under some circumstances, create conditions in the stream ideal for the growth of anerobic bacteria which multiply rapidly, causing rapid putrefaction and giving rise to offensive odors. While the organic constituents of the waste consume oxygen slowly, this by no means is an indication of the oxygen consuming properties of this waste. Under some conditions this waste consumes large quantities of oxygen and its oxygen demand is in reality very large. Many streams are discolored by the introduction of this waste due to the colloidal combination of tannin present in the waste with the iron contained in the stream.

As above pointed out, the chief polluting constituents of the waste constitute the large quantity of organic matter and the acid. This process, therefore, contemplates the neutralizing of the acid content of the waste and the removal of sufficient of the organic matter so that the treated waste will not cause a pollution of the stream into which it is discharged. The local conditions at a given pulp mill will, to some extent, govern the treatment of the waste discharged from such pulp mill. If the available dilution for the waste is large, the treatment may be such as to take advantage of such large dilution and where the available dilution is small, the treatment may be such that the small dilution will effectively care for the waste.

In treating sulphite mill waste in accordance with my process, the first step comprises delivering the waste into an enlarged settling zone or basin wherein it assumes a relatively quiescent state for a period sufficient to permit the suspended matter to settle out. Due to the tendency of the suspended matter to clot, it settles out quite rapidly. After the suspended matter has been permitted to settle out in the second step of my process, the waste is passed in intimate contact with porous calcium carbonate of the character of lump travertine in its natural state. The time period of contact between the waste and the porous calcium carbonate should be closely controlled to effect neutralization of the acid content of the waste and prevent deterioration of the calcium carbonate due to deposits on the surface thereof. I find that a two minute period of contact between the waste and the calcium carbonate produces satisfactory results. The large surface offered by the cellular structure of the calcium carbonate produces ideal conditions for the neutralizing action to go on rapidly and completely.

The steps above described merely remove the suspended matter and the acid content of the waste. The removal of these constituents effects a very material drop in the oxygen demand of the waste and effects a most decided improvement in the effluent over the untreated waste as it issues from the pulp mill. In some instances, the waste may be sufficiently purified by steps 1 and 2 to permit its direct discharge into a stream, since by subjecting the waste to these steps 1 and 2 of my process the necessary dilution therefor is reduced from 100 to 1 to 40 to 1.

The waste still contains, however, a substantial quantity of organic matter and its oxygen demand is still relatively large. Accordingly where the available dilution is small, I provide a third step or final treatment for the waste. In this final treatment, the colloidal content of the effluent produced by steps 1 and 2 of my process, is largely removed. In this final treatment the waste is subjected to the action of any one of a plurality of treating mixtures. The function of the treating mixture employed is to cause an alkaline reaction in the solution, thereby causing all colloids in the solution to have a negative charge and to supply to the solution an electrolyte producing material which dissociates, forming an excess of positive ions which are adsorbed by the negative colloids, thus neutralizing the charge of the colloids. A further constituent of the treating mixture effects a coagulation and settling of the colloids, the stability of which has been destroyed by the neutralizing of the electrical charges thereof.

Any one of the following mixtures may be advantageously employed as the treating agent in carrying out the third step of my process:

Mixture "A": Calcium sulphate, hydrated lime and ferrous sulphate in the following proportions:—

Calcium sulphate 1.6 pounds per 1000 gallons of liquid waste treated.

Hydrated lime 2.4 pounds per 1000 gallons of liquid waste treated.

Ferrous sulphate .6 pounds per 1000 gallons of liquid waste treated.

Mixture "B": "Solid waste," (designating a material recovered from the waste solutions discharged from an alkali plant in the manufacture of chloride of lime, chlorine and caustic soda,) hydrated lime, calcium sulphate and ferrous sulphate in the following proportions:—

Solid waste 4.2 pounds per 1000 gallons of liquid waste treated.

Calcium sulphate 1.5 pounds per 1000 gallons of liquid waste treated.

Hydrated lime 1.3 pounds per 1000 gallons of liquid waste treated.

Ferrous sulphate .5 pounds per 1000 gallons of liquid waste treated.

In the above mixtures I may substitute waste dust collected from the precipitators in the manufacture of cement for the calcium sulphate in mixture "A" and for the "solid waste" in mixture "B." I may also substitute dibasic calcium phosphate for the ferrous sulphate of these mixtures. Dibasic calcium phosphate has marked colloidal properties in an alkaline solution and functions as a superior coagulant.

As illustrating the operation of the process, I give the following example:—A typical sulphite waste was treated which showed upon analysis:

| | |
|---|---|
| Total solids | 1253 P. P. M. |
| Suspended matter | 226 P. P. M. |
| Organic matter | 831 P. P. M. |
| Suspended organic matter | 221 P. P. M. |
| Suspended mineral matter | 5 P. P. M. |
| Total mineral matter | 422 P. P. M. |
| Calcium salts as calcium sulphate | 380 P. P. M. |
| Acidity as sulphurous acid | 40.6 P. P. M. |
| Oxygen demand (10 days) | 500 |
| Dilution necessary | 100 |

The solid matter content of this waste amounted to 73.11 grains per gallon. The free acid content was 2.3 grains per gallon. The suspended matter of sulphite pulp mill waste is practically all organic matter in the form of finely divided cellulose and constitutes about one-fifth of the total solid matter content of the waste. About two-thirds of the solid matter content of the waste is organic. The above analyzed waste when subjected to treatment by my process employing steps 1, 2 and 3 and using mixture "A" in step three, yielded an effluent which showed upon analysis:

| | |
|---|---|
| Total solids | 1542 P. P. M. |
| Organic matter | 405 P. P. M. |
| Mineral matter | 1137 P. P. M. |
| Suspended matter | 2 P. P. M. |
| Acidity | None |
| Oxygen demand (10 days) | 60 |
| Dilution necessary | 12 |

It will be noted that the treatment of this waste by my process effected a reduction of 100% in the acidity of the waste and 99.1% in the suspended matter content of the waste as well as 51.2% in the organic matter content of the waste and a reduction in the oxygen demand of 88%, while the necessary dilution to care for the waste was reduced from the ratio of 100 to 1 to 12 to 1.

Effluent produced by steps 1 and 2 of my process in treating the above analyzed waste showed upon analysis the following:—

| | |
|---|---|
| Total solids | 1207 P. P. M. |
| Total suspended matter | 5 P. P. M. |
| Total organic suspended matter | 5 P. P. M. |
| Total organic matter | 610 P. P. M. |
| Total mineral matter | 592 P. P. M. |
| Calcium salts as calcium sulphate | 550 P. P. M. |
| Oxygen demand (10 day) | 200 |
| Dilution necessary | 40 |
| Acidity | None |

It is to be noted that the acidity was entirely eliminated by steps 1 and 2 of the process, that these steps further effected a very high percentage reduction in the suspended matter as well as a 60% reduction in the oxygen demand. The effluent from steps 1 and 2 of my process could be cared for by a dilution of 40 to 1 and if a dilution of this amount were available, this effluent could be directly discharged into a stream without being subjected to the third step of my process above described. The progress is exceedingly efficient and can be practiced very economically inasmuch as the sludge produced has a market value as fertilizer at least equal to the cost of the treatment of the waste.

I claim:—

1. A process for treating sulphite pulp mill waste comprising introducing the waste to a settling zone wherein it is maintained in a relatively quiescent state to permit the suspended matter to settle out, thence passing the liquid waste substantially free from suspended matter through porous calcium carbonate, and maintaining a time period of contact between said liquid waste and calcium carbonate of substantially two minutes.

2. A process for treating sulphite pulp mill waste comprising introducing the waste to a settling zone wherein it is maintained in a relatively quiescent state to permit the suspended matter to settle out, thence passing the liquid waste substantially free from suspended matter through porous calcium carbonate, maintaining a time period of contact between said liquid waste and calcium carbonate of substantially two minutes, and subjecting the liquid waste subsequent to passage through said calcium carbonate to the action of a mixture containing an electrolyte producing material and a coagulant.

3. A process for treating sulphite pulp mill waste comprising introducing the waste to a settling zone wherein it is maintained in a relatively quiescent state to permit the suspended matter to settle out, thence passing liquid waste substantially free from suspended matter but while still having a substantial content of colloidal matter present therein through porous calcium carbonate, maintaining a time period of contact between said liquid waste and calcium carbonate sufficient to substantially completely neutralize any acid content of the liquid waste, and subjecting the liquid waste subsequent to passage through said porous calcium carbonate to the action of a mixture containing an electrolyte producing material and a coagulant to precipitate the colloidal matter content and yield a non-putrescent, clarified effluent.

4. A process for treating sulphite pulp mill waste comprising introducing the waste to a settling zone wherein it is maintained in a relatively quiescent state to permit the suspended matter to settle out, thence passing the liquid waste substantially free from suspended matter but while still having a substantial content of colloidal matter present therein through porous calcium carbonate, maintaining a time period of contact between said liquid waste and calcium carbonate sufficient to substantially completely neutralize any acid content of the liquid waste, and subjecting the liquid waste subsequent to said contact period with calcium carbonate to the action of a mixture containing calcium sulphate and a suitable coagulant to precipitate the colloidal matter content and yield a non-putrescent, clarified effluent.

5. A process for treating sulphite pulp mill waste comprising introducing the waste to a settling zone wherein it is maintained in a relatively quiescent state to permit the suspended matter to settle out, thence passing the liquid waste substantially free from suspended matter through porous calcium carbonate, maintaining a time period of contact between said liquid waste and calcium carbonate sufficient to substantially completely neutralize any acid content of the liquid waste, and subjecting said liquid waste subsequent to said contact period with calcium carbonate to the action of a mixture containing an electrolyte producing material and dibasic calcium phosphate.

6. A process for treating sulphite pulp mill waste comprising introducing the waste to a settling zone wherein it is maintained in a relatively quiescent state to permit the suspended matter to settle out, thence passing the liquid waste substantially free from suspended matter through porous calcium carbonate, maintaining a time period of contact between said liquid waste and calcium carbonate sufficient to substantially completely neutralize any acid content of the liquid waste, and subjecting said liquid waste subsequent to said contact period with calcium carbonate to the action of a mixture containing calcium sulphate and dibasic calcium phosphate.

7. A process for treating waste sulphite liquor having an acid reaction, a substantial content of suspended organic matter and a substantial content of organic matter present in the waste in colloidal form comprising, initially delivering the waste to a zone wherein it is maintained in a quiescent condition for a time period sufficient to permit the suspended matter content to largely settle out, thence passing the waste in contact with calcium carbonate for a time period just adequate to effect substantially complete neutralization of the acid in the waste, and thereafter introducing to the waste an alkali, an electrolyte and a coagulant to transform the colloids remaining in the waste into suspensoids and to coagulate the resulting suspensoids.

JOHN T. TRAVERS.